(12) United States Patent
Bass et al.

(10) Patent No.: US 7,072,299 B2
(45) Date of Patent: Jul. 4, 2006

(54) CREDIT-BASED RECEIVER USING SELECTED TRANSMIT RATES AND STORAGE THRESHOLDS FOR PREVENTING UNDER FLOW AND OVER FLOW-METHODS, APPARATUS AND PROGRAM PRODUCTS

(75) Inventors: Brian Mitchell Bass, Apex, NC (US); Clark Debs Jeffries, Durham, NC (US); Michael Steven Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 09/933,526

(22) Filed: Aug. 20, 2001

(65) Prior Publication Data

US 2003/0035373 A1    Feb. 20, 2003

(51) Int. Cl.
 *H04J 1/16* (2006.01)
(52) U.S. Cl. ................................. 370/235; 370/468
(58) Field of Classification Search ............. 370/235, 370/236.1, 236.2, 465, 412, 229–232, 468
 See application file for complete search history.

(56) References Cited

U.S. PATENT DOCUMENTS

| 4,449,182 | A | | 5/1984 | Rubinson et al. ........... 364/200 |
| 5,319,638 | A | * | 6/1994 | Lin ............................. 370/235 |
| 5,515,359 | A | | 5/1996 | Zheng ........................... 370/13 |
| 5,719,853 | A | * | 2/1998 | Ikeda ........................... 370/229 |
| 5,740,174 | A | | 4/1998 | Somer ......................... 370/402 |
| 5,748,613 | A | | 5/1998 | Kilk et al. ..................... 370/231 |
| 5,777,987 | A | | 7/1998 | Adams et al. ................ 370/336 |
| 5,898,671 | A | * | 4/1999 | Hunt et al. ................... 370/235 |
| 6,078,565 | A | | 6/2000 | Ben-Michael et al. ....... 370/236 |
| 6,097,698 | A | | 8/2000 | Yang et al. ................... 370/231 |
| 6,097,705 | A | | 8/2000 | Ben-Michael et al. ....... 370/315 |
| 6,385,168 | B1 | * | 5/2002 | Davis et al. .................. 370/230 |
| 6,715,007 | B1 | * | 3/2004 | Williams et al. ............... 710/52 |

OTHER PUBLICATIONS

"Fibre Channel Tutorials and Resources", http://www.tol.unh.edu/training/fc/fc_tutorial.html#Flow_Control, May 4, 1998.

* cited by examiner

*Primary Examiner*—Huy D. Vu
*Assistant Examiner*—Nittaya Juntima
(74) *Attorney, Agent, or Firm*—Joscelyn G. Cockburn; Joseph C. Redmond, Jr.; Morgan & Finnegan

(57) ABSTRACT

A receiver may be adapted to prevent overflow or underflow of its data storage by generating a transmit rate value as a feedback to the sender. Speed adjustments are performed periodically with a fixed time period denoted by Dt. Transmission rates are explicitly 0, Max/2, and Max. The receiver queue is itself drained at a rate R that at any time satisfies $0<=R<=Max$. The level of occupancy of the receiver storage queue is denoted by Q. The maximum capacity of the receiving queue is designated Qmax, so at any time, $0<=Q<=Qmax$. Two thresholds T1 and T2 (with $0<T1<T2<Qmax$) of levels of the receiver queue value Q are determined. A transmit rate is then determined by the level of the receiver queue Q compared to the thresholds. The transmit rate feedback value achieves the desired goal of avoiding overflow and, once the value of Q has been positive at least once, avoiding underflow.

21 Claims, 3 Drawing Sheets

Service rate of receiving queue (Max = .125)

Transmit rate as fraction of Max

Qmax = 1, T1 = 3/16, T2 = 3/4

CREDIT-BASED RECEIVER USING SELECTED TRANSMIT RATES AND STORAGE THRESHOLDS FOR PREVENTING UNDER FLOW AND OVER FLOW-METHODS, APPARATUS AND PROGRAM PRODUCTS

BACKGROUND OF INVENTION

1. Field of Invention

This invention relates to digital communications networks and related apparatus. More particularly, the invention relates to receivers using thresholds on queues of received information to generate transmit rates and communicating those rates to senders for prevention of underflow and overflow of said queues.

2. Description of Prior Art

In Fibre Channel networks, one flow control mechanism for congestion control is the monitoring in a receiver of queue lengths of data awaiting processing by the receiver. The receiver informs the sender of a "credit" value that can be translated into a rate at which the sender sends data. A tutorial on credit based flow control systems for Fibre Channel is described in notes by InterOperability Lab of the University of New Hampshire at
http://www.iol.unh.edu/training/fc/
  fc_tutuorial.html#Flow_Control updated May 4, 1998. Typically, the credit or, as it is called herein, transmit rate is determined heuristically and performance may not be guaranteed. What is needed in the art is a receiver which periodically refreshes the transmit rates it generates and thereby provides transmit rates which can be guaranteed to prevent overflow or underflow of the receiver.

U.S. Pat. No. 5,515,359, of Zheng issued May 7, 1996 describes a system for controlling traffic in a digital communication network to avoid data loss due to congestion utilizes an integrated credit-based and rate-based traffic control approach, and adjusts the rate at which data is transmitted from a source in accordance with feedback in the form of rate and credit adjustment information from a network reflecting the ability of the network to transmit data and the destination to receive data. In one embodiment, a source end system sends out resource management cells composed of various fields containing rate and credit information. The intermediate systems of the network and the destination end system update the corresponding fields according to their congestion status and send the resource management cells back to the source end system so that the source end system controls the data transmission accordingly. In a preferred embodiment, a source end system calculates an allowed sending rate from each of the fields in a resource management cell, and the minimum one among them is used to control data transmission.

U.S. Pat. No. 5,777,987 of Adams et al. issued Jul. 7, 1998, describes a method and apparatus for using a primary FIFO and one or more secondary FIFOs in parallel to simplify flow control and routing in packet communication operations wherein at least one FIFO (buffer) is associated with each of a plurality of receiving nodes or components within a receiving node. The received packets are applied simultaneously to a primary FIFO and to all associated secondary FIFOs in the receiver of a packet communications link. After receipt of a packet, the packet is removed from any secondary FIFOs which correspond to receiver nodes or components to which the packet was not routed. For all receiving nodes or components to which the packet was routed, if the packet was stored in each associated secondary FIFO without overflow, then the packet is also purged from the primary FIFO. If any secondary FIFO overflowed by storage of the received packet, then the packet is purged from the overflowed FIFO and the packet remains stored in the primary FIFO for further processing. Flow control signals are generated and applied to the transmitting source as required in accordance with the status of the primary FIFO. The secondary FIFOs are not directly relevant to flow control logic. The receiving component corresponding to each secondary FIFO locates the next packet for processing by inspecting the associated secondary FIFO as well as the primary FIFO if the secondary FIFO overflowed. These methods and apparatus simplify flow control and routing control in packetized communication receivers U.S. Pat. No. 5,748,613 of Kilk, et al. issued May 5, 1998 describes a method of pacing a stream of data transmitted from a data source to a buffered data destination with a determined number of available storage units, the data destinations being configured to consume data and thereby to free storage units for receipt of additional data. The pacing of data communication includes: (1) identifying a beginning transmit rate; (2) incrementing the beginning transmit rate with each storage unit freed to identify an present transmit rate; (3) transmitting units of data in accordance with determined limits, the number of data units sent providing a transmission count; (4) selectively updating the determined number of available storage units by determining the difference between the beginning transmit rate and the present transmit rate, and determining the sum of the result and the previously determined number of available storage units to provide an updated determined number of available storage units; and (5) selectively updating the determined number of available storage units by determining the difference between the transmission count and the previously determined number of available storage units to provide an updated determined number of available storage units.

U.S. Pat. No. 6,097,705 of Ben-Michael, et al. issued Aug. 1, 2000, describes a repeater device for forwarding a data packet from a first Ethernet collision domain to a second Ethernet collision domain, the device having a plurality of ports, each port for connection to an independent Ethernet collision domain. Furthermore, each port has an associated receive buffer and an associated transmit buffer, and there is a means for forwarding a data packet from the receive buffer of a receiving port to the transmit buffer of a transmitting port. A data packet received at the receiving port is then first stored in that port's the receive buffer, is forwarded to the transmit buffer of the transmitting port, and is then transmitted from the transmit buffer by the transmitting port.

None of the above prior art discloses a credit based receiver which periodically adjusts transmit rates and storage thresholds and guarantees the prevention of overflow and underflow in the receiver

INVENTION SUMMARY

A credit based digital communication network is adapted to prevent overflow or underflow of a data storage queue in a receiver by generating a transmit rate value as a feedback to the sender. The rate adjustments are performed periodically with a fixed time period denoted by Dt. It is assumed that the sender always has a superabundance of data to send. The data transmit rates are fractions of the maximum possible data transmit speed, designated Max. The value of Dt is assumed to be greater than the transmit delay. Since the sender always has a superabundance of data to send, a flow control mechanism can specify any transmit rate up to and including Max at any time. In a preferred embodiment, the transmit rates are explicitly 0, Max/2, and Max. The receiver queue is itself drained at a rate R that at any time satisfies $0<=R<=Max$. The level of occupancy (in bits or other data units) of the receiver storage queue is denoted by Q. The maximum capacity of the receiving queue is designated Qmax, so at any time, $0<=Q<=Qmax$. Two thresholds T1 and T2 (with $0<T1<T2<Qmax$) of levels of the receiver queue value Q are determined based upon queuing analysis. A transmit rate is then selected from the possible values by comparison of the receiver queue Q to the thresholds. The transmit rate value so calculated achieves the desired goals of avoiding overflow and, once the lower threshold has been a positive value at least once, avoiding underflow. As a result the receiver queue is never completely full and never completely empty, regardless of the rate R at which the receiver queue is drained, with $0<=R<=Max$.

DESCRIPTION OF THE DRAWINGS

The invention will be further understood from the following description of a preferred embodiment taken in conjunction with an appended drawing, in which.

DESCRIPTION OF PREFERRED EMBODIMENT

Figure 1:
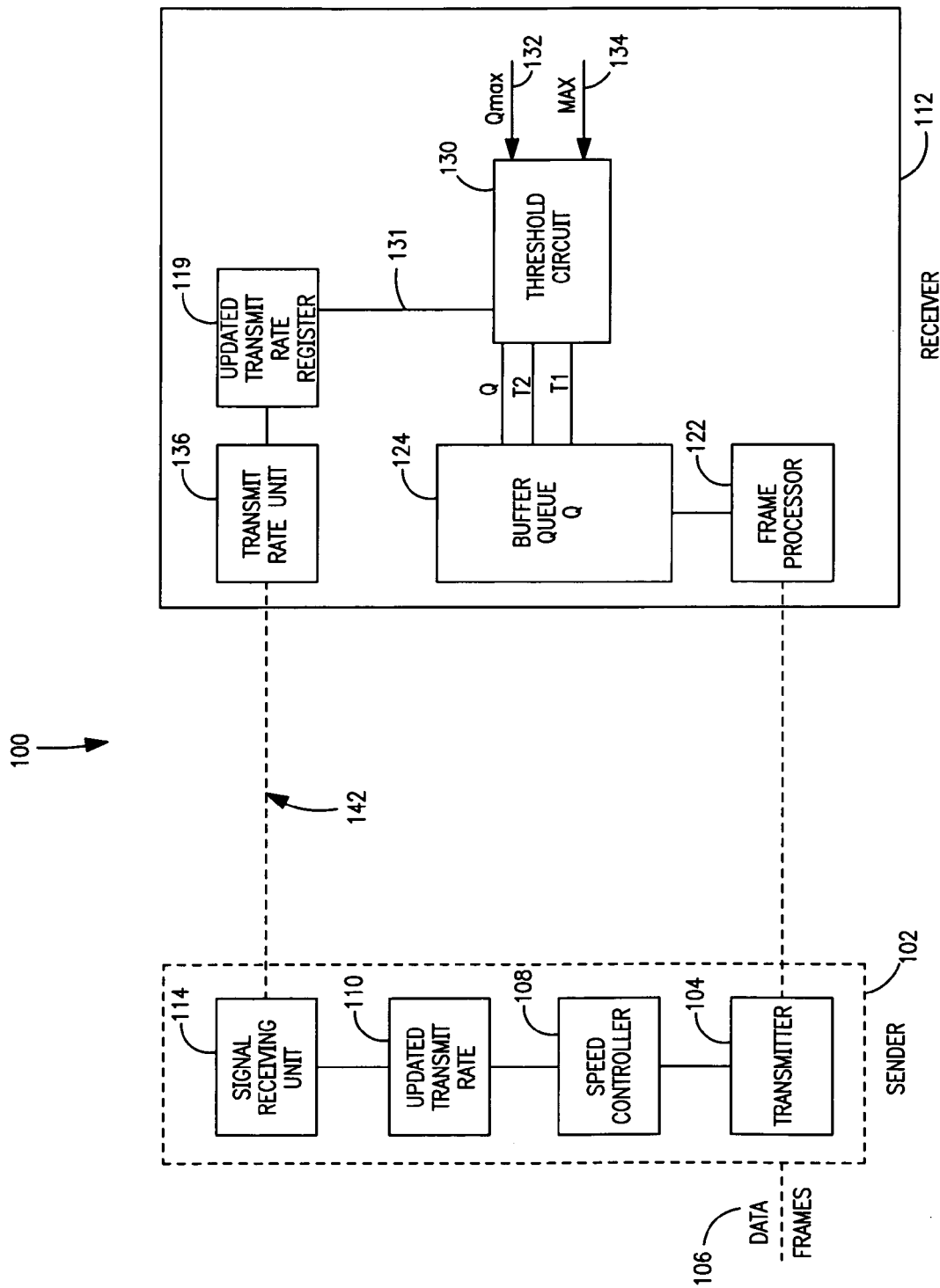
FIG. 1 is representation of a credit-based digital communication network adapted to prevent overflow or underflow of a data storage queue in a receiver and incorporating the principles of the present invention.

In FIG. 1, one embodiment of a credit based communication system 100 is disclosed.

The system 100 includes a sending station 102 including a transmitter 104 responsive to data packets 106 and a speed or transmit rate controller 108. The speed controller sets the transmit rate (Tr) of the transmitter 104 at transmit rates Tr=0, Tr=Max/2 and Tr=Max where Max denotes the maximum transmit rate of the transmitter. The speed controller is responsive to an updated transmit rate 110 received from a destination 112 via a signal receiving unit 114.

The destination 112 receives the data packets 106 in a packet processor 122. The data packets 106 are provided to a buffer queue 124 having a maximum capacity of Qmax. A threshold circuit compares the occupancy of the queue 124 with thresholds T1 and T2 specified by the present invention. The threshold circuit 130 periodically provides an updated transmit rate to a transmit rate register 119 via connection 131. The threshold circuit 130 calculates and sets a lower threshold T1 and an upper threshold T2 in the buffer 124 based upon Max value 134, Qmax value 132. The details of calculating the thresholds T1 and T2 are based on queuing analysis which will be provided hereinafter. The thresholds T1 and T2 are the thresholds in the buffer 124 used to prevent underflow and overflow, respectively. While two thresholds are described, any number of thresholds may be calculated for the buffer as will be described hereinafter. The transmit rate stored in the register 119 is then periodically communicated from a transmit rate unit 136 to the sender 102 via a communications link 142.

The threshold values T1 and T2 are calculated by a threshold circuit 134 and then compared by the threshold circuit to the level of data packets awaiting processing and temporarily stored in the buffer 124. In one embodiment, if the data packet level stored in the buffer is greater than T2, then an updated transmit rate of 0 is communicated to the sender. Else, if the level of data packets stored in the buffer is greater than T1, then a transmit rate of Max/2 is communicated to the sender. Else, a transmit rate of Max is communicated to the sender. The transmit rate is processed by a transmit rate unit 136 and communicated over a communications link 142 to a signal receiving unit 114. The flow control transmit rate is updated periodically every Dt time units and communicated to the sending unit whereupon the sender 102 sends some data at a rate equal to a fraction of the maximum rate to the receiver 112.

Queuing analysis demonstrates underflow and overflow can be prevented in the receiver provided the following conditions are met:

(1) Dt is much larger than the time delay of communicating the computed transmit rate from receiver to sender or time delay in transmission of data from sender to receiver. This is a lower limit on Dt.

(2) The maximum possible change in one time period Dt of signal update in receiver queue level is by definition Dt*Max. This value should fulfill the inequality Dt*Max<Qmax/8. This is an upper limit on Dt.

The transmit rate signals are as follows:
1. if $Q>=T2$, then transmit rate=0
2. else if $Q>=T1$, then transmit rate=Max/2
3. else transmit rate=Max.

That is, if $T2<=Q<=Qmax$, then the sender is signaled to send nothing. If $T1<=Q<T2$, then the sender is signaled to send at the rate Max/2. If $0<=Q<T1$, then the sender is signaled to send at the rate Max.

The present invention also includes specification of the values of T1 and T2. That is, T1 and T2 must fulfill conditions (a), (b), and (c), where:

$$T1 > Qmax/8 \quad \text{Eq(a)}$$

$$T2 < 15*Qmax/16 \quad \text{Eq(b)}$$

$$T1 <= T2 - Qmax/16 \quad \text{Eq(c)}$$

Theorem 1. The conditions (a), (b), (c) on T1 and T2 imply the queue occupancy Q will never reach Qmax. Also, once queue occupancy Q has exceeded 0, it will always thereafter be positive.

Proof:

The maximum value of queue occupancy will occur after a flow control interval Dt in which the transmit rate was either Max/2 or Max.

Suppose the first case, that is, that maximum value of queue occupancy occurs after a flow control interval in which the transmit rate was Max/2. Therefore the previous value of Q was less than T2. Therefore there must be a positive value X so that the previous Q value was T2−X. Thus, given a receiver drain rate R of at least 0, condition (2) on Dt and condition (b) on T2, the new Q value is at most:

$$T2-X+Max*Dt/2-0*Dt < T2-X+Qmax/16 < 15*Qmax/16+Qmax/16 = Qmax \quad \text{Eq(1)}$$

Suppose the alternative case, namely, that maximum value of queue occupancy occurs after a flow control interval in which the transmit rate was Max. Then there must be a positive value X such that the old Q value is T1−X. Given a receiver drain rate R of at least 0, condition (2) on Dt, and conditions (b) and (c), the new queue occupancy Q is at most:

$$T1-X+\text{Max}*Dt-0*Dt<T2-Q\text{max}/16-X+Q\text{max}/8<Q\text{max}. \qquad \text{Eq(2)}$$

Thus, in both cases, the deductions of equations 1 and 2 show the maximum queue occupancy possible ever is less than Qmax.

Concerning underflow, after Q occupancy has been positive at least once, a transmit rate of Max could not lead to a decrease in Q, given the restrictions on R. Therefore the minimum Q occupancy will occur after a flow control interval Dt in which the transmit rate is either 0 or Max/2.

Suppose the first case, that is, that minimum value of queue occupancy occurs after a flow control interval in which the transmit rate was 0. Therefore there must be a nonnegative value X so that the old Q value was T2+X. Since the drain rate R from the receiver is at most Max, the new Q value is at least T2+X−Max*Dt. Given condition (2) on Dt and conditions (a) and (b) the new Q value is at least:

$$T2+X-Q\text{max}/8>=T1+Q\text{max}/16-Q\text{max}/8>Q\text{max}/8-Q\text{max}/16. \qquad \text{Eq(3)}$$

Therefore the new Q value is at least Qmax/16.

If Suppose the alternative case, namely, that minimum value of queue occupancy occurs after a flow control interval in which the transmit rate was Max/2. Therefore there must be a nonnegative value X so that the old Q value was T1+X. With a drain rate R limited by Max, the new Q value is at least T1+X−Max*Dt. Given condition (2) on Dt and condition (a), the new Q value is therefore greater than Qmax/8−Qmax/8=0. Therefore the new Q value is greater than 0. This deduction and the deduction leading to equation 3 show that the new Q value must be positive.

End of proof of theorem.

Alternative embodiment: More thresholds could be specified with a finer granularity of transmit rates. For example, let N positive thresholds 0<T1<T2< . . . <TN<Qmax satisfy $$Q\text{max}*(1/16+i/16)<Ti<Q\text{max}*(1-1/(8*i)) \text{ for } i=1,2,\ldots, N \qquad \text{Eq(4)}$$

Let flow rates be specified as functions of Q as follows:
1. if Q>=TN then transmit rate=0
2. else if Q>=TN−1 then transmit rate=Max/N
3. else if Q>=TN−2 then transmit rate=Max/N−1)
4. else if Q>=TN−3 then transmit rate=Max/(N−2)
5. else if Q>=Ti then transmit rate=Max/(i+1)
6. else if Q>=T2 then transmit rate=Max/3
7. else if Q>=T1 then transmit rate=Max/2
8. else transmit rate=Max Theorem 2. Given the above N thresholds and rates, the queue occupancy Q will never reach Qmax. Also, once queue occupancy has exceeded 0, it will always thereafter be positive.

Proof.

Suppose previous Q was at or above TN. Then the rate was 0, so no increase is possible. Suppose previous Q was just below Ti, so rate was Max/i. Then the maximum value Q can attain less than $$Ti+\text{Max}*Dt/i<Q\text{max}*(1-1/(8*i))+(\text{Max}/i)*(Q\text{max}/(8*\text{Max}))=Q\text{max}. \qquad \text{Eq (5)}$$

Thus, the deduction leading to equation 5 shows overflow is impossible.

Suppose the previous Q was at or above Ti, so rate is Max/(i+1). Then the smallest Q can be is $$Ti+\text{Max}*Dt/(i+1)-\text{Max}*Dt>Q\text{max}*(1/16+i/16)+(Q\text{max}/8)*(1/(i+1))-Q\text{max}/8=Q\text{max}*(-1/16+1/(8*(i+1))+i/16)>0. \qquad \text{Eq (6)}$$

Suppose previous Q was below T1. Then the rate is Max, which is greater than or equal to the drain rate R, so depletion to zero is impossible. Thus, this observation and the deduction leading to equation 6 show underflow is impossible.

End of proof of theorem.

Figure 2:
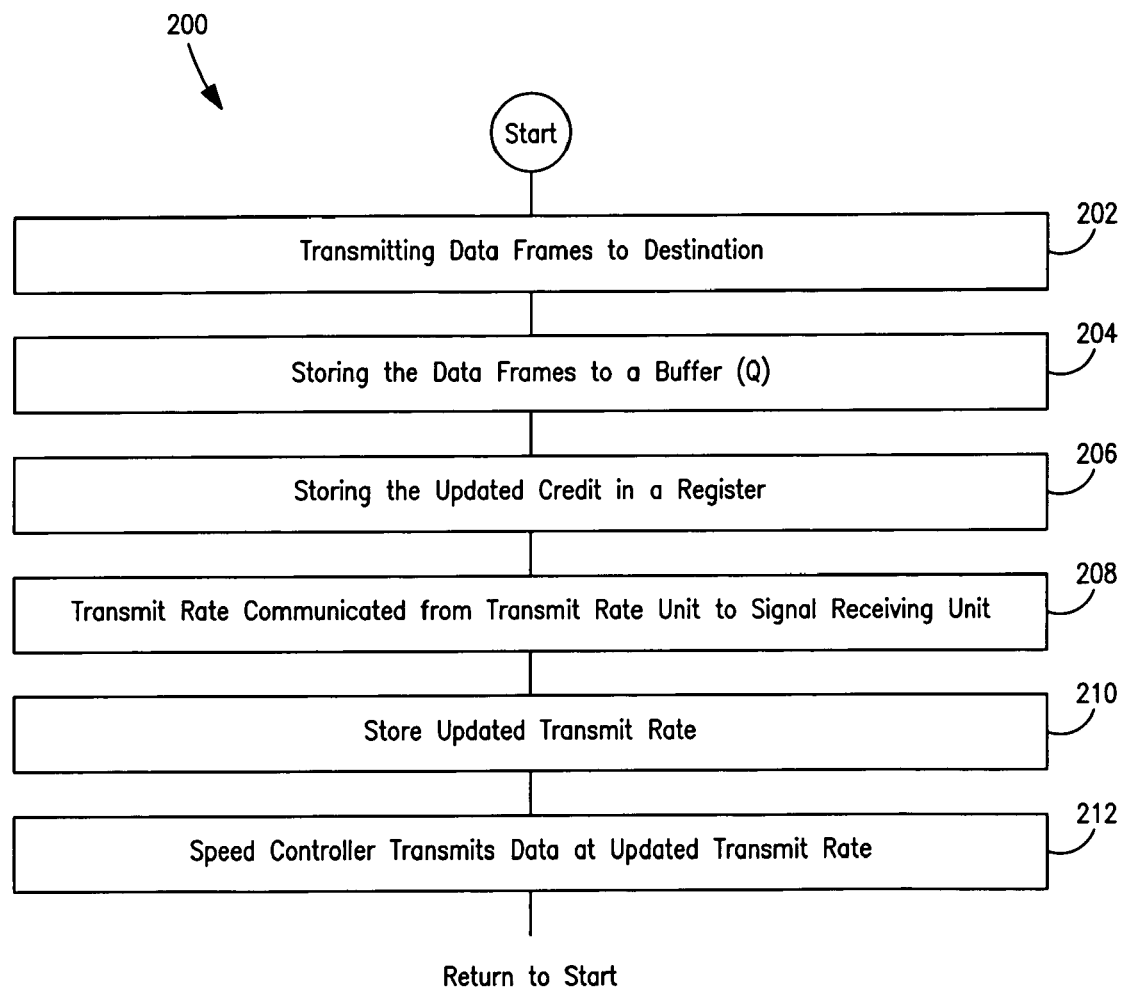
FIG. 2 is a flow diagram of a process implemented in the network of FIG. 1 for preventing overflow and underflow of a credit-based receiver.

Now turning to FIG. 2 a process 200 will be described in conjunction with FIG. 1 for implementing the prevention of underflow and overflow in a credit-based receiver in the digital communication network 100 of FIG. 1, as follows:

In step 202, data packets are transmitted to a destination 112. The rate of transmission is controlled by a speed controller 108.

In step 204, the data packets are received by a packet processor 122 and temporarily stored in buffer 124 while awaiting further processing. The updated transmit rate is determined by comparing buffer queue level Q with maximum capacity Qmax 132 and with thresholds T1 and T2 in the threshold circuit 130, and then the updated transmit rate is stored in register 119 in step 206.

In step 208 the updated transmit rate is communicated from the receiver 112 by action of the transmit rate unit 136 to the signal receiving unit 114 in the sender 102.

In step 210 the updated transmit rate 110 is stored in a register. In step 212 a speed controller 108 transmits data at the updated transmit rate from the transmitter 104.

Thresholds T1 and T2 are computed at initialization time from Qmax in a threshold circuit 130 by means of three equations described herein, namely, $$T1>Q\text{max}/8 \qquad \text{Eq(a)}$$

$$T2<15*Q\text{max}/16 \qquad \text{Eq(b)}$$

$$T1<=T2-Q\text{max}/16 \qquad \text{Eq(c).}$$

Figure 3A:
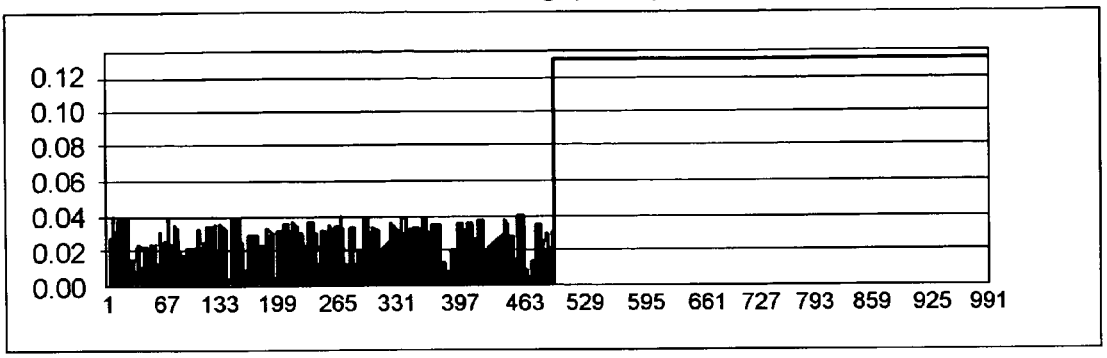
FIGS. 3A–C are graphs of the network of FIG. 1 demonstrating the credit based receiver storage (Qmax) is not subject to overflow or underflow for different transmit rates and thresholds.
Figure 3B:
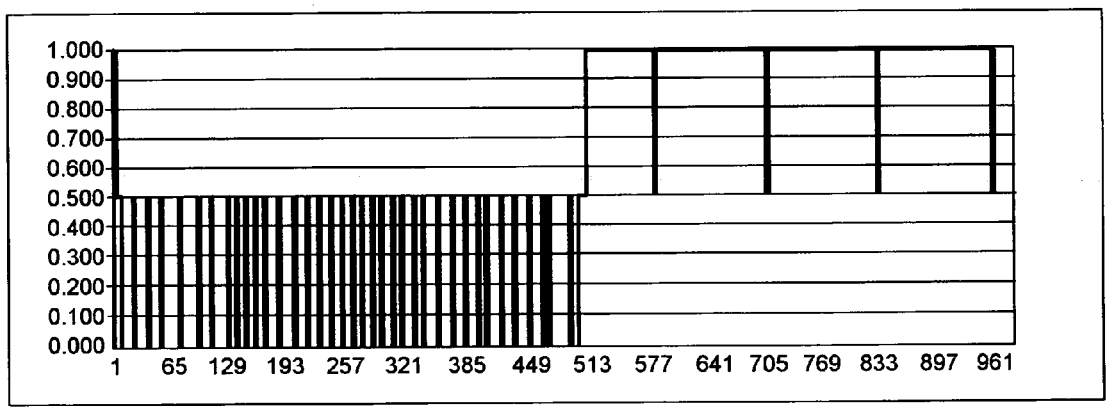
Figure 3C:
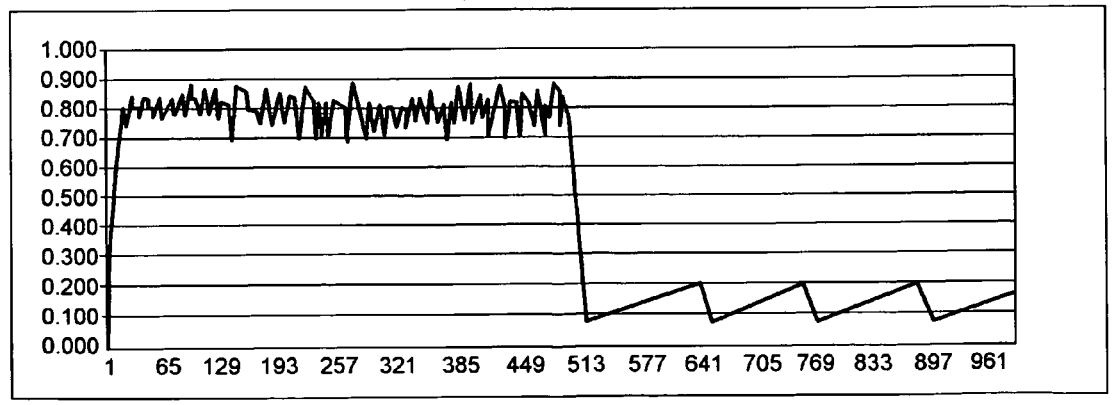

FIGS. 3A–C show test results of a credit-based receiver implementing the principles of the present invention and demonstrating overflow and underflow are prevented in the receiver.

FIG. 3A shows time units along the horizontal axis and the queue processing or service rate R of a queue on the vertical axis. In the example, the value of Qmax is 1 unit of data (for example, one megabit). The maximum service rate Max of the queue is 0.125 data units per time step Dt. The variable service rate R 302 is shown. For 500 time steps of duration Dt, the rate R is random and between 0 and 0.04 in units of data per time. For the next 500 time steps the rate R is constantly equal to the maximum rate Max=0.125 data units per time step.

FIG. 3B shows the transmit rates 304 calculated by the algorithm for the above conditions. Note that the transmit rate is 0 or Max/2 for the first 500 time steps. Then, as the service rate changes, the transmit rate is Max/2 or Max for the next 500 time steps.

FIG. 3C shows the level of queue occupancy 106 during the above experiment. Not that the value of Q does not enter into an overflow state. Likewise the value of Q does not enter into an underflow condition.

Thus, FIGS. 3A–3C demonstrate that the setting of transmit rate in accordance with the capacity of the buffer queue 124 relative to the thresholds T1 and T2 prevents the buffer from underflowing or overflowing for the transmit fractions.

While the invention has been described in conjunction with a preferred embodiment various changes can be made without departing from the spirit and scope of the invention as defined in the appended claims, in which:

We claim:

1. A credit-based system for determining a transmit rate from a sender guaranteeing the prevention of underflow and overflow conditions, comprising:
   (a) receiver processing apparatus which receives data packets;
   (b) storing apparatus, which receives and stores the data packets from the processing apparatus;
   (c) threshold circuit apparatus for updating transmit rate with fixed period coupled to a register apparatus for receiving the updated transmit rate; and
   (d) apparatus for communicating the updated transmit rate to a sender, wherein the threshold circuit apparatus calculates an underflow threshold (T1) for the storage apparatus using queuing analysis, having regard to inequalities $$T1 > Qmax/8 \qquad \text{Eq(a)}$$

$$T2 < 15*Qmax/16 \qquad \text{Eq(b)}$$

$$T1 <= T2 - Qmax/16 \qquad \text{Eq(c)}$$

where Qmax is a maximum storage capacity of data in the system, and T2 is an overflow threshold for the storage apparatus.

2. The system of claim 1 wherein the threshold circuit apparatus further:
   (f) calculates an overflow threshold (T2) for the storage apparatus using queuing analysis having regard to the inequalities $$T1 > Qmax/8 \qquad \text{Eq(a)}$$

$$T2 < 15*Qmax/16 \qquad \text{Eq(b)}$$

$$T1 <= T2 - Qmax/16 \qquad \text{Eq(c)}.$$

3. The system of claim 1 wherein the threshold circuit apparatus further:
   (g) calculates a first transmit update where the storing apparatus contains a quantity of the data packets between thresholds T1 and T2.

4. The system of claim 1 wherein the threshold circuit apparatus further:
   (h) calculates a second transmit update where the storing apparatus contains a quantity of the data packets less than T1.

5. The system of claim 1 wherein the updated transmit fraction apparatus further:
   (i) calculates a third transmit update where the storing apparatus contains a quantity of the data packets greater than T2.

6. The system of claim 1 further comprising:
   (j) second processing apparatus to which the updated transmit rate is communicated.

7. The system of claim 1 further comprising:
   (k) communication apparatus which transmits the updated transmit rate to the sender.

8. The system of claim 1 further comprising:
   (l) threshold apparatus which at initialization selects the values of thresholds set in the storage apparatus.

9. The system of claim 1 further comprising:
   (m) connecting apparatus which connects the register apparatus in a receiver to an updated transmit rate register in the sender.

10. A communication system for preventing overflow and underflow in a receiver, comprising:
   (a) a sender sending data at a selected transmit rate (Tr) to the receiver;
   (b) storage apparatus with occupancy (Q) in the receiver for storing the data;
   (c) transmit rate generating apparatus, which generates a transmit rate (Tr) as a feedback signal to the sender in a regular time interval (Dt) for controlling Tr;
   (d) threshold circuit apparatus which establishes threshold T1 in the storage apparatus indicative of the least storage in the storage apparatus to prevent underflow and threshold T2 indicative of a maximum storage in the storage apparatus to prevent overflow and determining the level of Q in the storage apparatus at regular time intervals; and
   e) the threshold circuit apparatus compares Q to T1 or T2 and communicates to the sender a transmit rate (Tr), every Dt time units where Tr=0 when T2<=Q<=Qmax; Tr=Max/2 when T1<=Q<T2 and Tr=Max when 0<=Q<T1 where the Qmax is maximum storage capacity of data in the receiver and Max is a maximum sending rate possible from the sender.

11. The system of claim 10 further comprising:
   (f) initialization algorithm which chooses Dt to be greater than the sum of transmission signal and receiver processing delays.

12. The system of claim 10 further comprising:
   (g) initialization algorithm which chooses Dt to be less than the value Qmax/(Max*8).

13. The system of claim 10 further comprising
   (h) communication apparatus for transmitting the transmit rate from the receiver unit to the sender as a feedback signal controlling the transmit rate.

14. In a communication system, a method for preventing overflow and underflow in a receiver comprising the steps of:
   (a) transmitting data at a selected transmit rate Tr from a sender to the receiver;
   (b) temporarily storing data awaiting processing in a storage apparatus with occupancy (Q);
   (c) generating a transmit rate (Tr) as a feedback signal to the sender in a regular time interval (Dt) for controlling Tr;
   (d) establishing a threshold T1 in the storage apparatus indicative of the least storage in the storage apparatus to prevent underflow;
   (e) establishing a threshold T2 in the storage apparatus indicative of the maximum storage in the Q to prevent overflow;
   (f) determining the level of Q in the storage apparatus at regular intervals of duration Dt; and computing and communicating a transmit rate Tr every Dt time units where Tr=0 when T2<=Q<=Qmax; Tr=Max/2 when T1<=Q<T2 and Tr=Max when 0<=Q<T1 where the Qmax is maximum storage capacity of data in the receiver and Max is the a maximum sending rate possible from the sender.

15. The method of claim 14 further comprising the step of:
   (g) choosing Dt to be greater than the sum of transmission signal and receiver processing delays.

16. The method of claim 14 further comprising the step of:
   (h) limiting the value of Dt to be less than the value Qmax/(Max*8).

17. The method of claim 14 further comprising the step of:
   (i) communicating the transmit rate from the receiver unit to the sender as a feedback signal controlling the transmit rate.

18. A medium, executed in a computer system, for preventing overflow and underflow in a receiver comprising:
  (a) program instruction transmitting data from a sender to a the receiver at a transmit rate (Tr) refreshed with regular period (Dt);
  (b) program instruction storing the data in a storage apparatus with occupancy Q in the receiver;
  (c) program instruction generating a transmit rate (Tr) as a feedback signal to the sender in a regular interval (Dt) for controlling the transmit rate Tr;
  (d) program instruction establishing a threshold T1 in the storage apparatus indicative of the least storage in the Q to prevent underflow;
  (e) program instruction establishing a threshold T2 in the storage apparatus indicative of the maximum storage in the Q to prevent overflow;
  (f) program instruction determining the level of data storage in the storage apparatus at credit intervals; and
  (g) program instruction computing and transmitting a transmit rate every Dt time units where Tr=0 when $T2<=Q<=Qmax$; Tr=Max/2 when $T1<=Q<T2$ and Tr=Max when $0<=Q<T1$ where the Qmax is maximum storage capacity of data in the receiver and Max is a maximum sending rate possible from the sender.

19. The medium of claim 18 further comprising the step of:
  (h) program instruction choosing at initialization the value Dt to be greater than the sum of transmission signal and receiver processing delays.

20. The medium of claim 18 further comprising the step of:
  (i) program instruction choosing at initialization the value Dt to be less than the value $Qmax/(Max*8)$.

21. The medium of claim 18 further comprising the step of:
  (j) program instruction communicating the transmit rate from the receiver unit to the sender as a feedback signal controlling the transmit rate.

* * * * *